Figure 1:
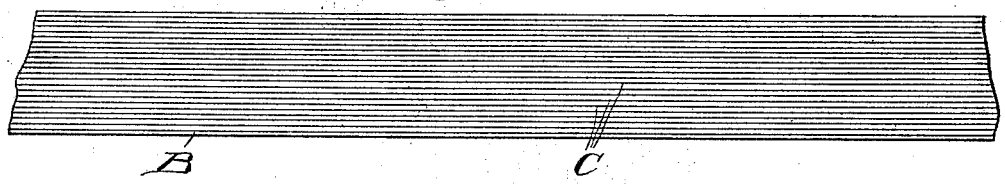

(No Model.)

J. F. PALMER.
BICYCLE OR OTHER TUBING.

No. 489,714. Patented Jan. 10, 1893.

Witnesses:
Clifford N. White
Jno. A. Christianson

Inventor:
John F. Palmer,
By Dyrenforth & Dyrenforth
Attys

UNITED STATES PATENT OFFICE.

JOHN F. PALMER, OF RIVERSIDE, ILLINOIS.

BICYCLE AND OTHER TUBING.

SPECIFICATION forming part of Letters Patent No. 489,714, dated January 10, 1893.

Application filed August 9, 1892. Serial No. 442,545. (No model.)

*To all whom it may concern:*

Be it known that I, JOHN F. PALMER, a citizen of the United States, residing at Riverside, in the county of Cook and State of Illinois, have invented a new and useful Improvement in Bicycle and other Tubing, of which the following is a specification.

My invention relates to an improvement in the manufacture of tubing, and the like, in the form of hose pipe, &c., and more particularly in the form of pneumatic tires for bicycles.

The object of my invention is to produce a tube of rubber, or the like, in which the rubber or similar material shall have a substantially uniform density and be free from the pin holes and other defects which it has heretofore been found difficult if not impossible to prevent.

A further object of my invention is to provide a fabric for use as a reinforcing strip for tubing of this nature which shall equalize or balance the longitudinal extension of the tube and the transverse extension thereof, under introduced pressure, the last-named property being particularly desirable when employed in connection with the improvements in pneumatic tires for bicycles of the character automatically to close any punctures that may be produced therein, which form the subject-matter of Letters Patent of the United States Nos. 476,679, 476,680, and 476,681 granted to me June 7, 1892.

In the manufacture of rubber tubing it has been the usual practice to form the same in one of two ways: either by making a flat strip of rubber and lapping the edges into the form of a tube, or to form the tube upon a straight mandrel or core subsequently removing the core therefrom. In both cases, of course, the tube is formed of the raw material and vulcanization is then resorted to to form the product into a continuous unseamed length. For vulcanizing it has been the usual process, more particularly where the tube or tire is to be made in the form of an annulus, to inclose the tube within a hollow die having the intended shape of the finished product.

Air, gas, or the like, dry, highly expansive fluid is then forced into or generated in the interior of the rubber tube and held therein while the product remains in the vulcanizing chamber, the expansion of the fluid serving to exert the necessary pressure, which coupled with the heat of the furnace produces perfect vulcanization of the product. Where a straight tubing is employed it has been the practice to introduce an internal core and to wrap the rubber with canvas, or the like, and it has been suggested that flexible foil may be employed for this purpose, the steam pressure within the vulcanizing chamber exerted from the outside of the rubber serving the purpose of the internal pressure in the previous method referred to.

In the production of annular tubing the method which involves the employment of an annular internal mandrel or core is not practicable, while on the other hand the production of an annular tube by a method which involves the producing of a straight tube is equally undesirable for obvious reasons. A great objection to the method suggested, which involves the introduction of air, gas, or other fluid, into the interior of the tube to force it by internal pressure against the surrounding mandrel is, that the gas or other fluid enters the rubber and forms blow holes, pockets, and the like, or is generated within the rubber by the expansion of foreign fluids held in the body of the raw material, or in the meshes of the canvas, when present, which results in pin holes in places, sometimes extending even entirely through the rubber. For use as a pneumatic tube such a product is of little value.

In my Letters Patent No. 476,680, granted June 7 1892, I refer to the fact that a non-stretching fabric is somewhat difficult to obtain in the market, but that I have produced a product which, under the conditions of its use is practically, though perhaps not absolutely non-extensible, by cutting canvas diagonally into strips and utilizing two or more such strips superimposed upon each other in such a manner that the fibers will have opposite diagonals. The stretching of this double strip brings about a shortening of the lateral edges, and hence the production of a partial tube of canvas of annular form which corresponds closely with the external configuration of the pneumatic tube employed with the bicycle.

I am aware that it has been suggested that greater strength can be obtained in the outer, usually canvas, covering of a pneumatic tire by winding the canvas in the form of strips spirally about the tube, but there are two objections to this product. First, it is impossible to wind a strip of even narrow width spirally about a tube annular in outline and have equal closeness of adherence in all parts of the width of the canvas strip; and it is further found that the canvas thus applied to a pneumatic tire interferes materially with its resiliency. Moreover in the case of the canvas thus wound and also where a thread is wound around the tube in such a manner that they will be in frictional contact with each other, the friction of the indenting action exerted upon the tube causes the canvas or the adjacent threads to break very often and particularly where the thread is employed this objection renders the product practically useless until mended.

It is the further object of my invention entirely to overcome the objections here urged and at the same time to find a substitute for the method of producing the substantially non-stretching fabric described in my said granted Letters Patent, which although entirely operative, is believed to be capable of improvement in the direction of making the product more nearly non-stretching, and rendering the same more durable.

In carrying out my improvement relating to the making of the tubing, whether for bicycle uses or otherwise, I prefer to employ the product which I have produced as a substitute for the diagonally cut canvas, but it will at once be understood that my process of making the tubing is not necessarily limited to the use of this product, nor is this product limited in its use to the manufacture of the tubing. First, to form the tube I employ a mandrel having the shape of an annulus and given an irregular, circumferential cross-sectional area; that is to say, the periphery of the annulus thus produced is cut away to afford a rest for a collapsed soft rubber tube. The rubber tube having been made in an ordinary rubber press and supplied in the course of formation with the proper ingredients for vulcanization, is powdered inside with soap-stone, flour, or the like substance, which will prevent the cohesion of the rubber surfaces the ends joined and is thereupon collapsed by withdrawing the air from within the same. When in this collapsed condition it is placed upon the periphery of the annular mandrel, the reduced portion of which is of such a dimension that when the tube is applied its convex surface will form approximately a portion of a circle, in cross-section, the remainder of which is afforded by the inner or larger part of the mandrel. Thereupon the mandrel carrying the collapsed tube has wound about it a substantially non-stretching fabric, or if preferred perhaps tin foil or other suitable substance, but preferably the particular fabric hereinafter described, and which comprises oppositely winding strips of rubber having embedded and vulcanized therein longitudinal parallel threads of linen, or the like material, the two strips being relatively so wound that the threads cross at any desired angle. When thus wound the mandrel is placed in the vulcanizing chamber and subjected to the usual action, the steam or other pressure therein being exerted as to the entire tubing against the mandrel, while the introduced soap-stone prevents the opposite faces of the tube from adhering together. When the vulcanization is complete and the tube is removed from the mandrel the introduction of air will cause it to expand to a circular form in cross-section substantially without creases or indentations, or if they exist the creasing or crimping will be so slight as not to be objectionable. When it is desired to give to one surface of the tubing an increased thickness by its reversal of curvature to give to the tubing a condition under which it will to a certain extent close any punctures that may be made therein, this may be done in the same manner, but it is then desirable that a substantially non-stretching backing shall be placed upon the tube before it is applied to the mandrel. This supposes that the concave face of the rubber is thus to be thickened. If the outer face is thus to be thickened it is preferable to form the reduced part of the mandrel on the inner instead of on the outer peripheral side thereof.

To make the substantially non-extensible strip, the employment of which is here suggested, I proceed as follows: While calendering the rubber in the usual calendering rolls threads are fed to the sheet in the direction of its movement through the calendering machine, these threads being close together but in the main, at least, out of contact with each other and becoming embedded in the soft rubber as the sheet is formed. When the sheet is vulcanized these threads become securely embodied therein and substantially prevent longitudinal stretching of the sheet, although lateral stretching is still possible. This sheet is then cut into strips longitudinally of the threads therein, or in other words the strips are so cut that each will have embedded in it threads extending longitudinally thereof. When such a strip is wound spirally about a mandrel or tubing it is quite apparent that as it can not stretch in one direction, and there is no occasion to stretch it at right-angles to the longitudinal thread, a longitudinal strain or a transverse strain will result in the stretching to a small extent in either direction only. When another such strip is wound upon the mandrel or tube in the opposite direction to the first it is found that either longitudinal or transverse stretching of the envelope to a limited and easily controlled extent is possible, but if the strip be stretched to its limit longitudinally, transverse stretching is entirely prevented, and on the other hand if the transverse stretching be performed to the limit permissible, then longitudinal stretching becomes practically impossible. It will be understood, of course, that the amount of stretching which results from the inherent elasticity of the fiber is not taken into account. The effect referred to is produced by the fact that when a certain amount of longitudinal stretching has occurred, the threads formerly crossing each other transversely are brought more nearly to a common straight line presenting the longitudinal fiber to the stretching action. If longitudinal stretching of the fabric is to be entirely prevented, this may be accomplished by winding a further number of strips (one or more) at a more acute angle over that already applied.

A great advantage of the rubber strip over a canvas strip is found in the possibility of intimate contact between all points of the strip and the annular mandrel or tube, and to carry this to a greater extent if possible I prefer to wind the tube with the rubber strip carrying the thread before the latter has been vulcanized or before complete vulcanization has been performed. It is not in all cases desirable to employ the unvulcanized strip in the manufacture of the tubing by the method hereinbefore described and hereinafter claimed, but I have obtained good results from its employment, although the use of a vulcanized strip is in many cases more desirable.

In connection with a pneumatic tire for bicycles, hose and other products made of rubber tubing and which require to be externally reinforced with a fabric composed wholly or in part of linen, or the like, the laterally non-extensible strip produced as described has many important advantages. It is found to afford a substantially perfect reinforcement equal in strength and in all valuable characteristics to the canvas ordinarily employed, and by reason of the possibility of perfect application, and the readiness with which the edges may be cemented together, it has many decided advantages which cannot be obtained with canvas. Moreover, the limitation placed upon the longitudinal or transverse stretching and the tendency of the threads when separated, as the effect of stretching the fabric, to return to their original relation to each other by reason of the resiliency of the rubber, gives to the tread of the wheel a resiliency which is not to be obtained with canvas or with thread alone, and by reason of the fact that the threads are out of contact with each other and are not subjected to any frictional action upon each other, breakage due to this cause is prevented.

In winding hose upon a reel it is quite obvious that the outer surface of the hose, or that farther from the hub of the reel, is very much lengthened, and the strain thus exerted upon the canvas covering of the hose is such as to strain it materially and render it more easily broken under the internal pressure. By the spiral arrangement of the holding threads adopted in connection with this invention this strain is equalized and the weakening of the product from this cause is prevented.

Figure 2:
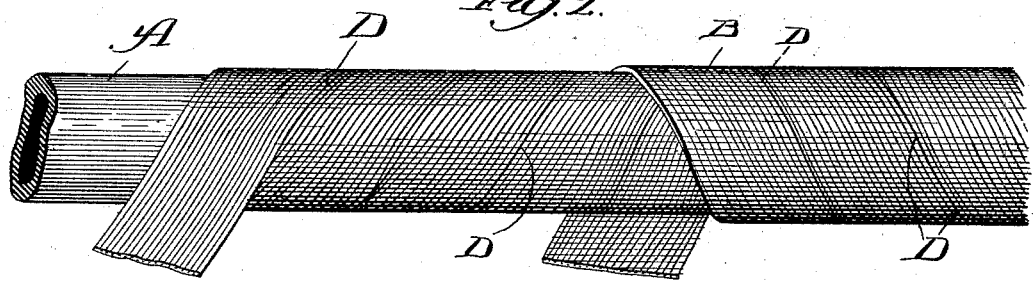

In the drawings—Figure 1 is a plan view of a strip of rubber having embedded therein longitudinal parallel threads in accordance with my invention: Fig. 2 is a perspective view of a section of rubber tube wound spirally with superimposed strips of rubber carrying longitudinal parallel threads; and Fig. 3 is a perspective view of a mandrel to which is applied a collapsed soft rubber endless tubing preparatory to vulcanization.

A represents a tube made of rubber, B a rubber strip having embedded therein longitudinal parallel fibrous threads C preferably of linen or similar material of a character to be substantially non-stretching. In applying two such strips wound in opposite directions spirally upon the tube A, it is preferred to wind them as illustrated in Fig. 2, and to lap and join the edges by cementation or otherwise, as indicated at D in Fig. 2. It will be observed that lateral or transverse stretching of the envelope of the tube is prevented by the substantially straight direction of the strain upon the fibrous thread, while longitudinal stretching is still permitted.

Figure 3:
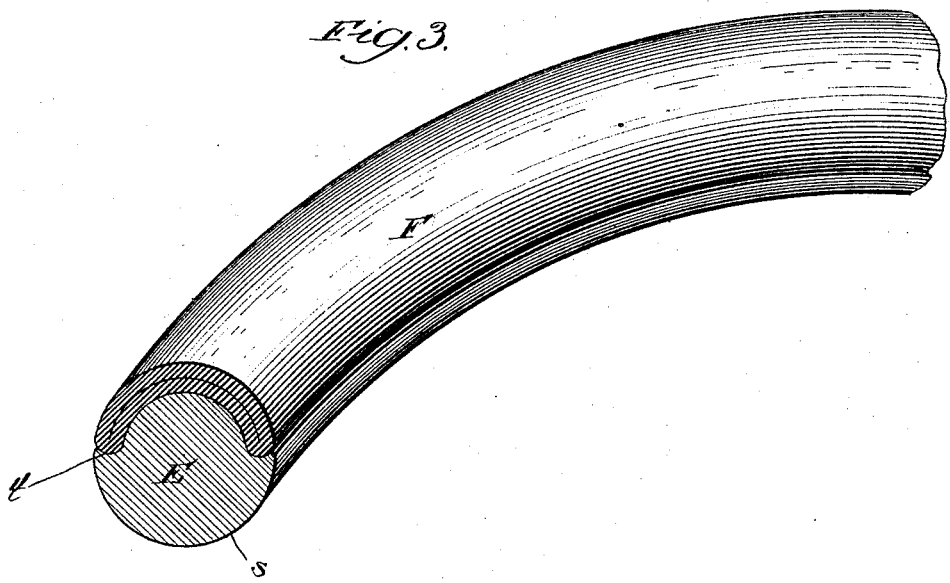

In Fig. 3 is illustrated the mode of applying the tube to the mandrel for purposes of vulcanization. E is the annular mandrel usually made of wood or iron having the peripheral surface cut away on the double curved line $t$, the depth of the cutting being equal to the thickness in transverse section of the collapsed soft rubber tube F, whereby the outer surface of the tube F forms with the larger part $s$ of the mandrel approximately a circle. It will be understood, however, that the exact formation of a circle is not essential, although preferred, and that satisfactory results can be obtained by having the reduced or recessed surface of the mandrel on the inner instead of on the outer peripheral side, in which case the collapsing of the tube is performed on the opposite curvature to that shown. It will be quite obvious that a tube may be made having embedded in its outer surface the spiral threads which made to cross each other serve to control the amount of stretching possible in either direction and prevent stretching in one direction when stretched in the other, such a tube being made by winding around a mandrel a strip of soft rubber having longitudinally therin embedded parallel fibrous threads, the strip being wound in a spiral and the edges joined by vulcanization. Ordinarily two or more such strips will compose a single tube. It will also be apparent that if a substitute for canvas is desired which shall not be of a character to permit friction of the threads upon each other, superimposed sheets of fabric may be utilized, each cut on a line diagonal to the direction of the threads and one sheet being applied to the other in such manner that the threads shall cross each other at an acute angle. Such a product may be used in the same manner as canvas is now used, to afford a covering for bicycle tires, hose &c., namely: by enveloping a tube or hose therein and sewing or sealing the longitudinal seam.

I do not limit my invention to any particular material employed in connection therewith, nor do I limit the manufacture of the tubing to the use either of the special material described or to any particular method of applying an envelope to keep it out of contact with the steam of the vulcanizing chamber; and in the use of the strip I do not limit myself in any sense to two oppositely winding layers, one alone being efficacious in many cases, and several layers being more advantageous in others. Neither do I limit myself to the production of an annular tube, as all shapes from straight to annular may be manufactured in the same way. Neither do I limit myself to a tube formed without longitudinal seam, nor to a method which involves as a preliminary step the formation of a tube, for it is quite obvious that the production of a seamed tube from a flat strip, the joint being made during vulcanization or subsequently, is clearly within the purview of my invention.

I do not herein lay specific claim to the fabric or the method of producing the same in other forms than such as are necessary for its use in connection with tubing as hereinbefore described, but in another pending application Serial No. 452,339, filed November 17, 1892, I have applied for a patent for the fabric generally and the method of producing the same.

What I claim as new and desire to secure by Letters Patent is—

1. As a new article of manufacture, a rubber tube for pneumatic and similar purposes, having spirally wound thereon and embedded and held therein by vulcanization fibrous threads of a substantially non-stretching character, substantially parallel with but out of contact with each other, substantially as described.

2. As a new article of manufacture, an envelope for rubber tubing, and the like, comprising a spirally wound strip of rubber, or the like, having embedded therein substantially parallel fibrous threads, substantially as described.

3. As a new article of manufacture, an envelope for rubber tubing, and the like, comprising a spirally wound strip of rubber having embedded therein substantially parallel fibrous threads extending longitudinally of the strip, the lateral edges of the strip being joined at adjacent spirals, substantially as described.

4. As a new article of manufacture, an envelope for rubber tubing, and the like, comprising two or more strips of rubber, or the like, each having embedded therein flexible threads substantially parallel with each other and each wound spirally about the tubing, one strip being wound in the direction opposite to the other, substantially as described.

5. As a new article of manufacture, an envelope for rubber tubing, and the like, comprising two or more strips of rubber, or the like, having embedded therein, substantially parallel fibrous threads extending longitudinally of the strip, said strips being wound spirally about the tube with their edges joined to form a continuous tubing, and one strip being wound in an opposite direction to the other, substantially as described.

6. As a new article of manufacture, a pneumatic tube for bicycles, and the like, comprising an endless annular tube of rubber having an envelope formed of two or more spirally wound strips of rubber, or the like, having embedded therein substantially parallel fibrous threads, one of said strips being wound in the direction opposite to that of the other, substantially as described.

7. The method of forming vulcanized endless tubing, which consists in forming the soft rubber before vulcanizing into a collapsed tube having introduced therein a cohesion preventing substance, such as soap-stone, applying the same thus collapsed to a mandrel having a surface adapted to receive it, winding the mandrel carrying the rubber with a flexible envelope, and thereupon vulcanizing, substantially as described.

8. The method of producing vulcanized endless rubber tubing, which consists in forming the soft rubber supplied with a vulcanizing agent into an endless collapsed tube having its adjacent interior faces prevented from adhering to each other, applying the collapsed tube to the periphery of a mandrel, said periphery being of the proper configuration to receive it, winding spirally about the mandrel carrying the rubber, a strip of vulcanized rubber having fibrous threads embedded therein longitudinally and substantially parallel, vulcanizing the product and thereupon removing the envelope, substantially as described.

9. A mandrel for use in producing vulcanized endless rubber tubing, comprising an annular body having its periphery reduced to afford a seat for the collapsed unvulcanized tubing, substantially as described.

JOHN F. PALMER.

In presence of—
J. W. DYRENFORTH,
M. E. WINN.